United States Patent
Yeh et al.

(10) Patent No.: US 6,240,510 B1
(45) Date of Patent: *May 29, 2001

(54) SYSTEM FOR PROCESSING A CLUSTER OF INSTRUCTIONS WHERE THE INSTRUCTIONS ARE ISSUED TO THE EXECUTION UNITS HAVING A PRIORITY ORDER ACCORDING TO A TEMPLATE ASSOCIATED WITH THE CLUSTER OF INSTRUCTIONS

(75) Inventors: Tse-Yu Yeh, Milpitas; Harshvardhan Sharangpani, Santa Clara; Michael Paul Corwin, Palo Alto, all of CA (US); Sujat Jamil, Chandler, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,387

(22) Filed: Aug. 6, 1998

(51) Int. Cl.[7] .................................................. G06F 9/15
(52) U.S. Cl. ........................................ 712/236; 712/206
(58) Field of Search ................................. 712/200–239

(56) References Cited

U.S. PATENT DOCUMENTS

| | | |
|---|---|---|
| 4,833,599 * | 5/1989 | Colwell ................................. 712/236 |
| 5,333,280 | 7/1994 | Ishikawa et al. . |
| 5,414,822 | 5/1995 | Saito et al. . |
| 5,655,098 * | 8/1997 | Witt ...................................... 606/159 |
| 5,699,536 | 12/1997 | Hopkins et al. . |
| 5,699,537 * | 12/1997 | Sharangpani .......................... 712/217 |
| 5,729,728 | 3/1998 | Colwell et al. . |
| 5,826,070 | 10/1998 | Olson et al. . |
| 5,860,017 | 1/1999 | Sharangpani et al. . |
| 5,903,750 * | 5/1999 | Yeh ...................................... 712/236 |

OTHER PUBLICATIONS

Sharangpani, Harsh, "Intel Itanium Processor Microarchitecture Overview", Intel, http://www.intel.com on Oct. 19, 1999. all pgs.*

Shanley, Tom, "Pentium Pro Processor Sytsem Architecture", Mindshare, Inc., pp. 63, 66, 67, 80, 89, and 109, 1997.*

Harshvardhan Sharangpani et al., U.S. Patent Application No. 08/949277 entitled Efficient Processing of Clustered Branch Instructions, Filed Oct. 13, 1997.

* cited by examiner

Primary Examiner—John A. Follansbee
Assistant Examiner—Stacy Whitmore
(74) Attorney, Agent, or Firm—Leo V. Novakoski

(57) ABSTRACT

A system is provided for processing concurrently one or more branch instructions in an instruction bundle. The system includes multiple branch execution pipelines, each capable of executing a branch instruction to determine a branch direction, target address, and any side effects. Linking logic receives the resolved branch information and identifies a first branch instruction in execution order for which the branch direction is taken.

32 Claims, 10 Drawing Sheets

SYSTEM FOR PROCESSING A CLUSTER OF INSTRUCTIONS WHERE THE INSTRUCTIONS ARE ISSUED TO THE EXECUTION UNITS HAVING A PRIORITY ORDER ACCORDING TO A TEMPLATE ASSOCIATED WITH THE CLUSTER OF INSTRUCTIONS

BACKGROUND OF THE INVENTION

Technical Field

This invention relates to microprocessors, and in particular to systems for processing branch instructions.

Background Art

Modern processors have the capacity to process multiple instructions concurrently at very high rates. Currently available processors are clocked at frequencies approaching the gigahertz regime. Despite the impressive capabilities of these processors, their actual instruction throughput on a broad cross-section of applications is often limited by a lack of parallelism among the instructions to be processed. While there may be sufficient resources to process, for example, six instructions concurrently, dependencies between the instructions rarely allow all six execution units to be kept busy. Consequently, there has been an increasing focus on methods to identify and exploit the instruction level parallelism ("ILP") needed to fully utilize the capabilities of modern processors.

Different approaches have been adopted for identifying ILP and exposing it to the processor resources. For example, speculation and predication operate through the compiler to address the bottlenecks that limit ILP. Speculative instruction execution hides latencies by issuing selected instructions early and overlapping them with other, non-dependent instructions. Predicated execution of instructions reduces the number of branch instructions and their attendant latency problems. Predicated instructions replace branch instructions and their subsequent code blocks with conditionally executed instructions which can often be executed in parallel. Predication may also operate in conjunction with speculation to facilitate movement of additional instructions to enhance parallelism and reduce the overall execution latency of the program.

One side effect of the above-described code movement is that branch instructions tend to become clustered together. Compiler techniques such as trace scheduling, superblock scheduling, and hyper block scheduling also cause branches to cluster at the end of a scheduled code block. Even in the absence these techniques, certain programming constructs, e.g. switch constructs and "if then else if" constructs, can cluster branch instructions in close proximity.

Serial processing of clustered branch instructions is highly inefficient. Fall through branches do not resteer the processor to a non-sequential code sequence, and thus have no impact on code flow. In serial execution, each fall through branch that is processed delays forward progress of the code segment by an additional clock cycle. Where branch instructions are clustered, multiple fall-through branches may be traversed before a branch that alters the control flow of the processor is executed.

SUMMARY OF THE INVENTION

The present invention is a system and method for processing clustered branch instructions concurrently.

In accordance with the present invention, a branch processing system includes multiple branch execution pipelines and linking logic. The linking logic is coupled to receive branch resolution information and identify a first executed branch instruction from one of the branch execution pipelines.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

DETAILED DISCUSSION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

The present invention is a system and method for processing clusters of branch instructions concurrently. In accordance with the invention, a branch processing system includes multiple branch execution pipelines. Each branch instruction in a cluster is assigned to one of the branch pipelines according to its execution order, and the branch instructions are processed concurrently. Here, execution order refers to the order in which the branch instructions would be executed if they were executed sequentially. Linking logic monitors branch resolution information for each branch instruction in a cluster and identifies the first branch instruction in execution order that is resolved taken. The results of this first taken branch instruction are committed to the architectural state. Results of any branch instructions that follow the first taken branch in execution order are ignored.

For one embodiment of the invention, a validation module compares branch resolution information from executed branch instructions with predicted branch information provided by a branch prediction module. The validation module triggers a resteer of the processor pipeline when the predicted and actual branch resolution information do not match.

Figure 1:
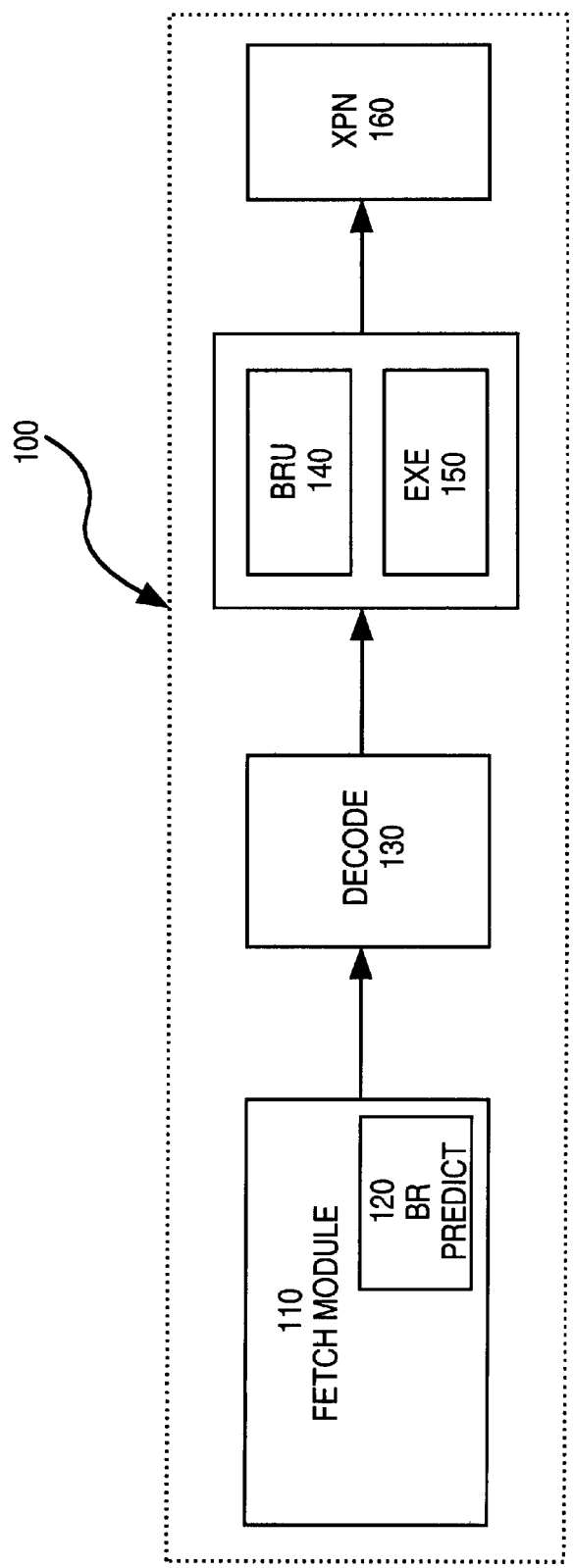
FIG. 1 is a block diagram of one embodiment of a processor pipeline that includes a branch processing system in accordance with the present invention.

FIG. 1 is a block diagram of one embodiment of a processor pipeline 100 that incorporates a branch processing system 140 in accordance with the present invention. Processor pipeline 100 includes an instruction fetch module 110, a branch prediction module 120, an instruction decode module 130, branch processing system 140, execution resources 150, and exception/commit module 160. Execution resources 150 represents non-branch execution units that are typically present in a processor pipeline. These include floating point execution unit(s) (FPU), integer execution unit(s) (IEU), and memory execution units. Exception/commit module 160 monitors pipeline events to determine whether to commit the results of instructions to the architectural state of the processor.

Fetch module 110 fetches instructions for processing by pipeline 100. To facilitate fetching and branch prediction operations, instructions may be identified through instruction pointers (IPs). Fetch module 110 provides IPs to branch prediction module 120, which accesses branch prediction information, when available, for those IPs that represent branch instructions. Branch prediction information indicates whether a branch is likely to be taken (branch direction). It typically also indicates a predicted target address, i.e. an address to which the branch instruction transfers control when it is taken. The predicted target address points to one or more target instructions that may be loaded into pipeline 100 when the branch is predicted taken. The alternative, fetching the target instructions when the branch instruction is executed by branch processing system 140 at the back end of pipeline 100, leaves the resources in pipeline 100 under utilized.

Instructions are decoded in decode module 130 and directed to appropriate execution resources according to their instruction type. Branch instructions are directed to branch processing system 140, where each is executed to determine the next instruction on the execution path and any side effects on the architectural state. For example, a conditional branch instruction specifies a target address and a branch condition. The branch condition determines whether the branch is taken or not taken, i.e. the branch direction. When the branch instruction is executed, processor control jumps to the instruction at the target address if the branch is taken or falls through to the instruction that follows the branch instruction if the branch is not taken. The target address may be specified by a pointer to a register (indirect branch) or as an offset from the IP of the branch instruction (IP-relative branch). The branch direction may be specified through a variable to which the branch instruction points. The variable is typically stored in a register that is written by compare instructions.

In accordance with the present invention, branch instruction module 140 is capable of executing one or more branch instructions concurrently and identifying a first taken branch instruction from among the concurrently executed branch instructions.

If no exceptions/faults are detected, the architectural state is updated to reflect the effects of the first taken branch. Branches following the first taken branch in the cluster are ignored. Branches that precede the first taken branch in the cluster are fall-through branches. Generally, fall-through branches have no effect on the architectural state. Loop branches, which adjust various loop counters even when they fall-through, are an exception.

For one embodiment of the invention, predicted branch information is validated by comparison with resolved branch information from processed branch and branch-related instructions. Here, resolved branch information refers to information generated by executing branch instructions or branch-related instructions such as compares, which may be used to determine branch conditions. When the predicted and resolved branch information do not match, instructions loaded into processor pipeline 100 based on the predicted information are not from the correct execution path. In this case, processor pipeline 100 is flushed and fetch module 110 is resteered to the correct instructions. When the predicted and resolved branch information match, instructions in processor pipeline 100 are from the correct execution path and processing proceeds uninterrupted.

Figure 2:
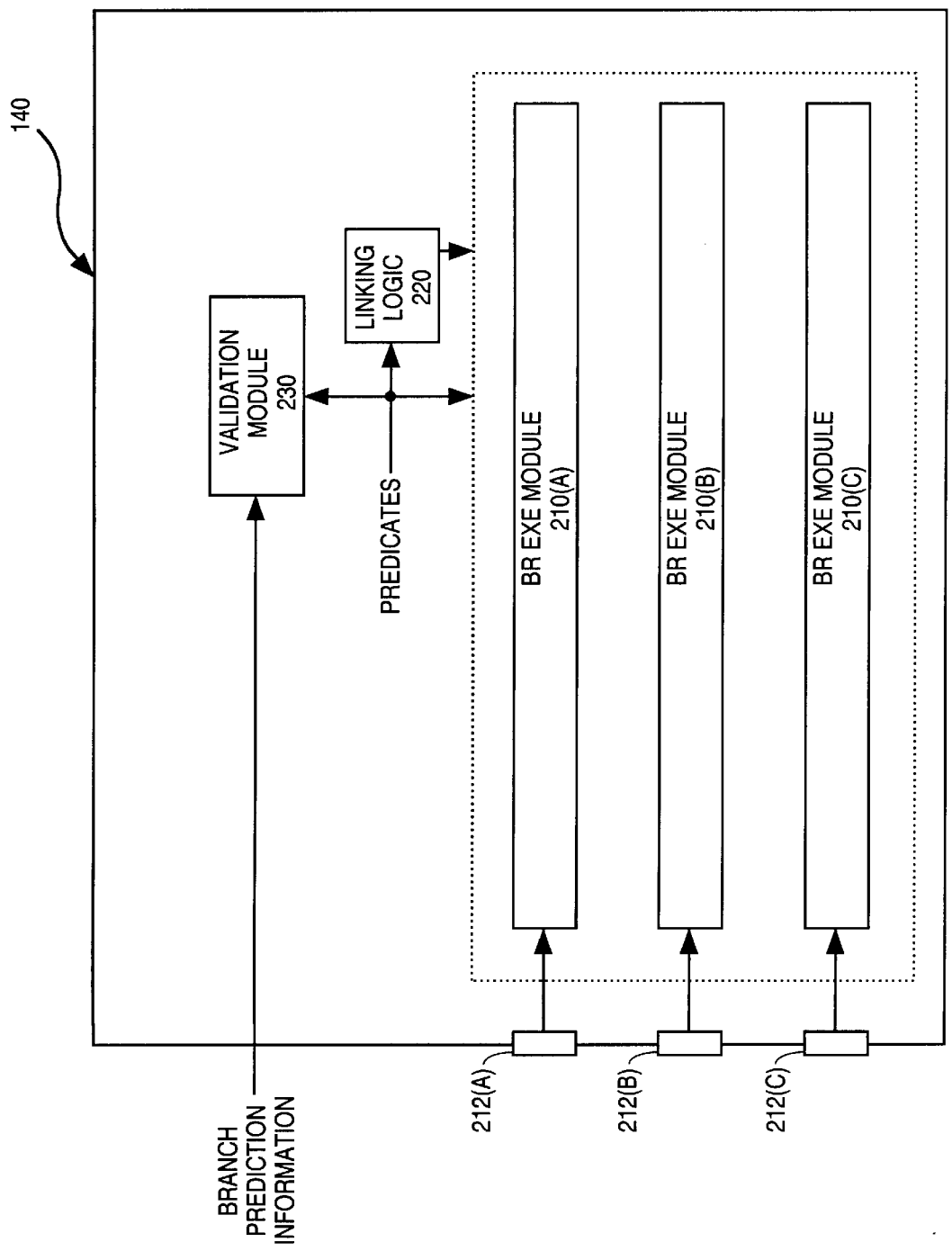
FIG. 2 is a block diagram of one embodiment of a branch processing system in accordance with the present invention.

FIG. 2 is a block diagram of one embodiment of a branch processing system 140 in accordance with the present invention. Branch processing system 140 includes multiple branch execution pipelines 210(a), 210(b), 210(c) (collectively, "pipelines 210") and linking logic 220. Also shown are ports 212(a), 212(b), 212(c) for providing branch instructions to associated pipelines 210(a), 210(b), 210(c), respectively, and a validation module 230. FIG. 2 illustrates the invention for the case where clusters of up to three branch instructions may be processed simultaneously. However, the present invention is not limited to this configuration, and may be modified to process any number of branch instructions concurrently.

Each pipeline 210 executes a branch instruction to determine the branch direction, the target address, and any side effects of the branch on the architectural state. Examples of side effects are return addresses calculated on execution of call branches and loop variables calculated on execution of loop branches. The latter include loop counters (LC), which track the iterations of associated loops, and epilog counters (EC), which track the number of stages remaining in software pipelined loops. Since multiple branch instructions may be executed concurrently and only the first branch in execution order is committed to the architectural state, side effects for each taken branch are maintained in a speculative state until linking logic 220 determines which branch, if any, is the first taken branch in the cluster.

Branch execution pipelines 210 and various resources of pipeline 100 determine branch directions, branch target addresses, and any side effects. For one embodiment of the invention, branch directions for, e.g., calls, returns, instruction-set switches, and returns from interrupts (RFIs) are determined by predicates, which typically are written by compare instructions. Each compare instruction is executed in conjunction with its corresponding branch instruction by, for example, IEU or FPU 150. For one embodiment of the invention, the result of the compare operation is represented by a value that is stored in a predicate register. The predicate register is indicated by a condition field of the branch instruction. The branch direction of loop branches may be determined by loop variables alone or in combination with predicates, depending on the type of loop.

Linking logic 220 employs resolved branch information associated with each executed branch instruction of a cluster to identify the first branch instruction in execution order that is resolved taken, i.e. first taken branch instruction (FTB) of a cluster. For one embodiment, the resolved branch information is provided as predicates by a predicate delivery unit and, in the case of loop instructions, as logical combinations of predicates and/or counter variables. Linking logic 220 uses this information to select a target address associated with the FTB. The selected target address may be used to resteer the pipeline in the event of a branch misprediction.

For one embodiment of the invention, FTB identification is simplified by assigning ranch instructions to pipelines 210(*a*), 210(*b*), 210(*c*) according to their order of execution. Here, execution order refers to the order in which the branch instructions of a cluster are encountered in the code segment. For a cluster of three branch instructions in the disclosed embodiment, pipeline 212(*c*) is assigned to the branch instruction that is third in execution order, pipeline 212(*b*) is assigned to the branch instruction that is second in execution order, and pipeline 212(*a*) is assigned to the branch instruction that is first in execution order. In a cluster of two branch instructions, pipeline 212(*c*) is assigned to the branch instruction that is second in execution order and pipeline 212(*b*) is assigned to the branch instruction that is first in execution order. Similar assignments apply for different numbers of pipelines and corresponding branch cluster sizes.

With this assignment strategy, linking logic 220 can identify the FTB through a priority selection scheme. For example, branch directions in pipelines 210 may be examined sequentially, beginning with pipeline 210(*a*), and the first taken branch identified in this order is the first taken branch in execution order, i.e. the FTB.

For one embodiment of the invention, validation module 230 is associated with branch execution pipelines 210 and linking logic 220 to support aggressive branch prediction strategies. Validation module 230 receives predicted branch information for a cluster from branch prediction module 120 and compares it with branch information generated by processing branch instructions from the cluster (resolved branch information). When the predicted and resolved branch information for the FTB match, the instructions that follow the FTB are from the correct execution path, and validation module 230 allows branch processing system 140 to proceed. When the predicted and resolved branch information do not match, validation module 230 flushes pipeline 100 and triggers the front end of the pipeline to access target instructions from the correct execution path. For one embodiment of the invention, validation module 230 causes the target address selected by linking logic 220 to be transferred to the front end of pipeline 100.

Once an FTB has been validated and no faults or exceptions have been generated by instructions preceding the FTB, side effects associated with the FTB are transferred from a speculative state to the architectural state of the program thread. Side effects of any branches that follow the FTB are ignored, regardless of the branch directions. Side effects of any non-loop fall-through branches that precede the FTB are also ignored, while those of fall-through loop branches update one or more loop counters.

Figure 3:
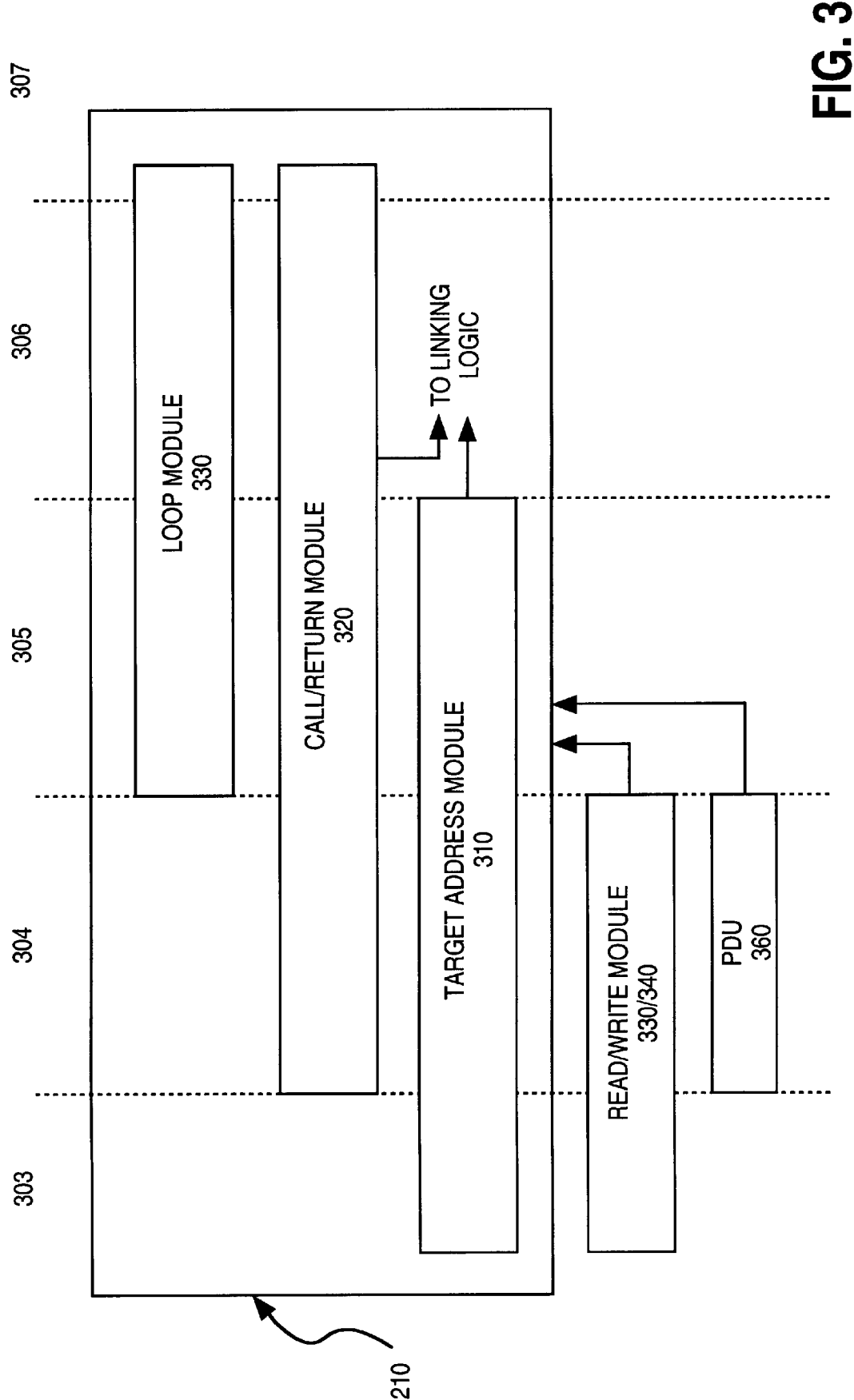
FIG. 3 is a block diagram illustrating one embodiment of a branch execution pipeline of FIG. 2.

FIG. 3 shows one embodiment of a branch execution pipeline 210 of FIG. 2. Pipeline stages 303–307 are shown in FIG. 3 to indicate when branch operations occur at various points along pipeline 210. In the absence of pipeline stalls or faults, successive stages of pipeline 100 operate on an instruction on successive cycles of the processor clock. The pipeline of FIG. 3 is provided for illustration only. The present invention may be implemented in pipelines having different numbers of pipe stages and distributions of resources among the pipe stages.

For the disclosed embodiment, execution pipeline 210 includes a target address module 310, a call/return module 320, and an optional loop execution module 330. Also shown are a predicate delivery module 360 and register read/write modules 340/350, which operate in conjunction with pipelines 210 to resolve branch instructions. For example, read/write modules 340/350 couple indirect branch target addresses, LC values, and EC values, between modules 310, 320, 330 and various registers associated with pipeline 100. Predicate delivery module 360 provides predicates to various components of branch processing system 140. The modules of FIG. 3 are shown separately to highlight their different functions. However, their functions may overlap and they may be combined in different ways to achieve the same results.

Target address module 310 generates a target address for a branch instruction as it transits stages 303–305. For the disclosed embodiment, target addresses for IP-relative and indirect branches may be generated in stage 303. In addition, target addresses for indirect branches may be by-passed into target address module 310 at stages 304 or 305 to accommodate timing constraints.

Call/return module 320 includes additional resources for processing call and return branch instructions. For example, it generates a return address in stage 303 for a call instruction and makes the return address available for storage or use by other pipeline resources. For the disclosed embodiment, the return address may be written to a branch register at stage 306, by-passed to other resources at intervening stages, or coupled to linking logic 220 as necessary. Call/return pipeline 320 also saves and restores architectural state data, e.g. privilege levels, loop variables, etc., on call and return branches, respectively.

Loop execution module 330 provides the additional resources necessary to process loop type branch instructions. For example, these resources update side effects associated with loop execution, e.g. LC, EC, etc., and resolve branch directions for loop branches. For one embodiment of the invention, only one of execution pipelines 210 is provided with loop module 330, and loop branch instructions are directed to this pipeline 210 for processing. This eliminates the need to reproduce the loop hardware in all pipelines 210. It also simplifies the hardware necessary to suppress instructions in the cluster that follow the FTB.

Figure 4:
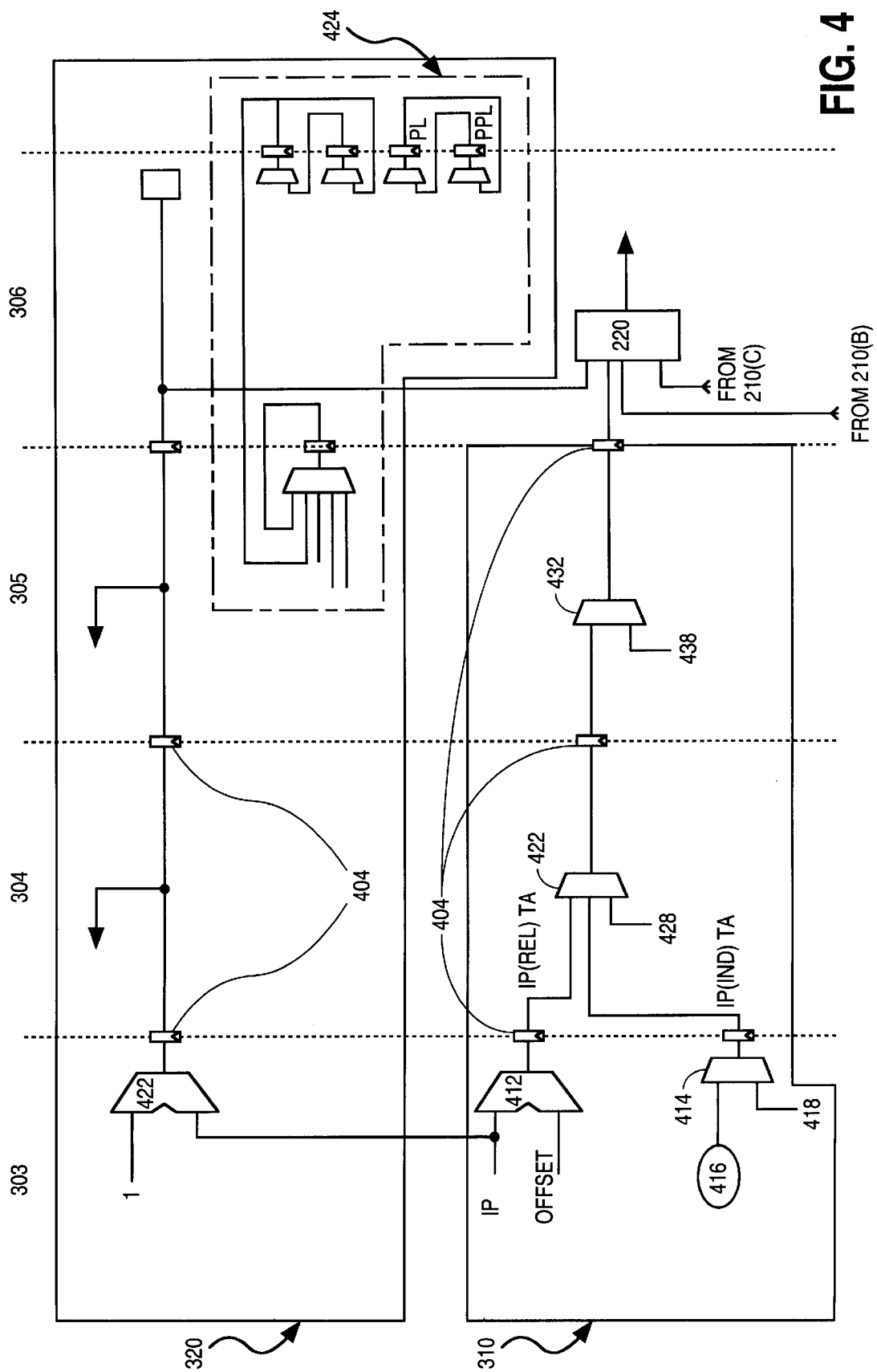
FIGS. 4 is a block diagram illustrating one embodiment of the address and return pipelines of FIG. 3.

FIG. 4 illustrates in greater detail one embodiment of target address and call/return modules 310, 320, respectively, suitable for use with the present invention. The disclosed embodiment of address module 310 includes an adder 412 to generate target addresses for IP-relative branch instructions and a multiplexer (MUX) 414 to select a target address source for indirect branch instructions. The source may be a branch register (BR) 416 or a by-pass input 418. At stage 304, A MUX 422 selects adder 412, MUX 414, or by-pass input 428 as the target address source, according to the branch instruction type and timing considerations. MUX 432 selects between a target address from stage 304 or one provided through by-pass input 438 in stage 305. The target address from module 310 (and target address modules in other branch pipelines 210) are coupled to linking logic 220 for selection in stage 306. Latches 404 stage data across the different pipe stage boundaries.

Call/return module 320 includes an adder 422 in stage 303 that generates a return address for a call branch instruction. Arrows in stages 303 and 304 represent by-passes available to couple the return address to various stages in this and other branch execution pipelines 210. The return address may also be coupled to linking logic 220 in stage 306. Block 424 represents components of call return pipeline 320 that update loop and privilege level (PL) variables to reflect call/return activity. For example, block 424 saves an architectural value of PL as a previous PL (PPL) on execution and commitment of a return branch instruction. The architectural value of PPL is restored to PL on execution and commitment of a return branch instruction. Block 424 is discussed in greater detail in conjunction with FIG. 5.

Figure 5:
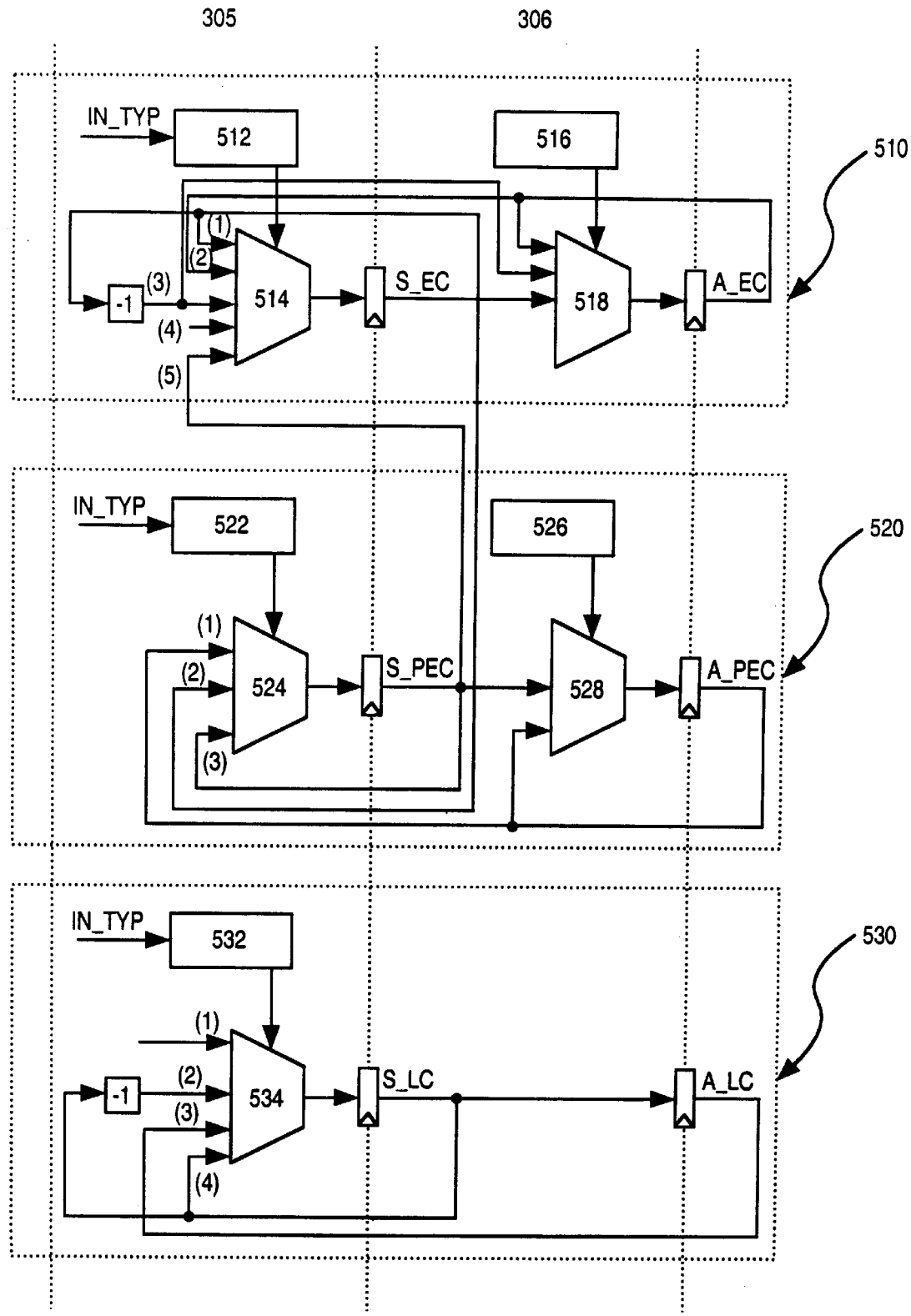
FIG. 5 is a block diagram illustrating one embodiment of the loop pipeline of FIG. 3.

FIG. 5 illustrates one embodiment of loop module 330 suitable for use in the present invention. Loop module 330 includes an EC update module 510, a previous EC (PEC) update module 520, and an LC update module 530. EC update module 510 includes logic for updating speculative and architectural values of a loop EC (S_EC and A_EC, respectively) to reflect branch and move instructions executed by branch processing system 140. PEC update module 520 and LC update module 530 perform similar update operations for speculative and architectural values of PEC and LC, respectively. Pipe stages 305, 306 are shown for reference.

Various types of loop instructions that may be processed by loop module 330 are identified in Table 1 along with the predicate/loop variable values for which the branch direction is taken (TK).

TABLE 1

| BRANCH TYPE | TAKEN CONDITION |
| --- | --- |
| CLOOP | LC != 0 |
| CTOP | LC > 0 \|\| EC > 1 |
| CEXIT | LC = 0 && EC ≦ 1 |
| WTOP | PR == 0 \|\| EC > 1 |
| WEXIT | PR == 1 && EC ≦ 1 |

Here, CLOOP is a counted loop, CTOP is a modulo-scheduled (software pipelined) counted loop in which the branch direction is resolved at the bottom of the loop body, and CEXIT is a modulo-scheduled counted loop in which the branch direction is resolved somewhere other than the bottom of the loop. WTOP and WEXIT are modulo-scheduled while loops corresponding to the counted loops CTOP and CEXIT, respectively.

In EC update module 510, a state machine 512 receives an instruction type signal (IN_TYP) along with any necessary predicate or speculative LC (S_LC) values and selects an appropriate mode to update the speculative EC (S_EC) value responsive to the received signals/values. The output of state machine 512 is coupled to the control input of a MUX 514 to update S_EC. For the disclosed embodiment of loop module 330, S_EC is: (1) unchanged by default; (2) updated to the architectural EC (A_EC) value when a flush or reset occurs in the previous cycle; (3) decremented when the epilog portion (S_LC=0, S_EC≠0) of a first taken CTOP/CEXIT branch is in stage 305 or when the epilog portion (PR=1, S_EC≠0) of a first taken WTOP/WEXIT branch is in stage 305; (4) updated to a by-passed EC value when a committed mov_to_EC instruction is in stage 305 of read/write module 340 or when a committed mov_to_PFS (previous function state) instruction is in stage 305 of read/write module 340 and a taken return is in stage 305; or (5) updated to a Previous EC value (PEC) when a taken return branch is in stage 305. Depending on timing constraints, it may be necessary to use predicted predicate values to determine whether the CTOP, CEXIT, WTOP, or WEXIT branch is the FTB in case (3).

A state machine 516 updates A_EC via MUX 518 with the current A_EC value by default or with the S_EC value. In the latter case, the A_EC value is updated to the by-passed EC value, the decremented EC value, or the PEC value when conditions (4), (3), or (5), respectively, are updated to stage 306.

In PEC update module 520, a state machine 522 selects an appropriate update mode for the speculative PEC (S_PEC) according to various input signals on each clock cycle. PEC is typically updated in response to call or return type branch instructions, which cause a current EC value to be saved or retrieved, respectively. For the disclosed embodiment, S_PEC is: (1) updated with the current A_PEC value when a flush or reset occurs in the previous cycle; (2) updated with the current S_EC value when a first taken call occurs in 305; or (3) updated with the S_PEC by default. A state machine 526 controls MUX 518 to retain the current value for A_PEC or to update A_PEC to the current value of S_PEC when conditions (1), (2), or (3) are updated to stage 306.

In LC update module 530, a state machine 532 updates S_LC through MUX 534 according to the state received signals/values on each clock cycle. For the disclosed embodiment, S_LC is: (1) updated to a by-passed LC value when a committed move is detected in stage 305; (2) decremented when a first taken CLOOP, CTOP, or CEXIT branch is in stage 305 and S_LC≠0, (3) updated to A_LC when a flush or reset event is detected on the previous cycle; and (4) unchanged when no update event is detected. Depending on timing constraints, it may be necessary to use predicted predicate values to determine that the CLOOP, CTOP, or CEXIT branch is the FTB for case (3).

A_LC is updated by the S_LC value according to which source updated Spec LC and the state of commit signals. In case (1), the by-passed value must be from a committed MOV_to_LC instruction. In case (2), the update must be from the FTB. If neither of these cases is detected, the current A_LC value is maintained.

For one embodiment of the invention, loop module 330 is present in the pipeline that processes the last branch instruction in execution order, e.g. pipeline 210(c) in the disclosed embodiment, and all loop type branches are directed to pipeline 210(c). This ensures that in any branch cluster that includes a loop instruction, the loop instruction will be last in execution order. This minimizes the use of loop execution resources in all cases in which an earlier branch instruction in a cluster is taken. It also eliminates the need to suppress branch instructions from the same cluster, i.e. concurrently processed branch instructions, following a first taken loop branch. The relatively complex nature of loop branches would otherwise impose sever timing constraints on this process.

In another embodiment of the invention, logic for implementing RFIs may also be included only in pipeline 210(c) and RFIs may be routed to this pipeline by decoder module 120. RFIs are singled out because they are processed at an instruction granular level, so that locations within a cluster or bundle of instructions must be tracked. A register associated with interrupt/exception logic may be used for this purpose. The other branches are processed at a cluster or bundle granular level, and only the starting address of the bundle need be tracked. For example, on completion of an interrupt, an RFI is executed and control is returned to the next instruction in execution order. This may be an instruction in the same bundle or cluster of instructions. On the other hand, following any other branch, control is passed to the first instruction in the bundle or cluster of instructions indicated by the branch target address.

For the disclosed embodiment, sufficient information is available by stage 305 to resolve branch instructions in pipelines 210 and determine their side effects. Linking logic 220 monitors this resolution information for each branch instruction in pipelines 210 and identifies the FTB, if any, in a cluster of branch instructions.

Figure 6A:
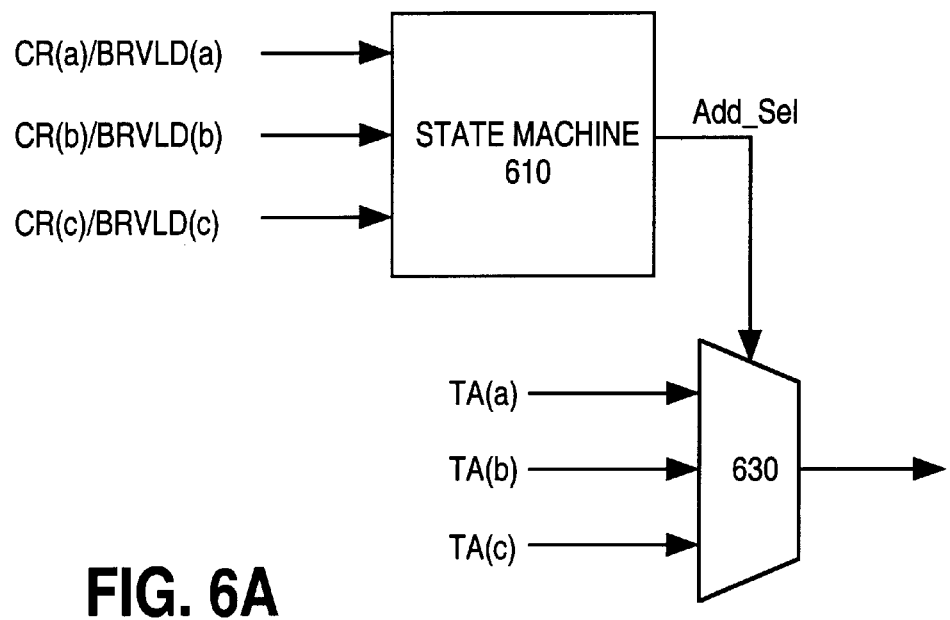
FIGS. 6A and 6B are block diagrams illustrating one embodiment of the linking logic of FIG. 2.

FIG. 6A illustrates one embodiment of linking logic 220 for the case in which three branch execution pipelines 210 are available and only pipeline 210(c) includes loop execution module 330. The disclosed embodiment of linking logic 220 includes a state machine 610 and a MUX 630. State machine 610 receives as input condition resolution and valid branch signals, e.g. CR(a)/BrVld(a), CR(b)/BrVld(b), CR(c)/BrVld(c), for pipeline 210 and outputs an address select signal (Add_Sel) that identifies the first branch instruction in execution order that is resolved taken (FTB). For non-loop branch instructions, CR may be a predicate provided by PDU 360. For loop branch instructions, CR(c) is the logical combination of predicate, EC, and LC values indicated in Table 2 for the loop branch type. To reduce timing constraints, S_EC and S_LC and predicated predicate values may be used to determine CR(c). Add_Sel is coupled to a control input of MUX 630, and target addresses from pipelines 210(a), 210(b), 210(c), e.g. TA(a), TA(b), TA(c), are coupled to data inputs of MUX 630. State machine 610 uses MUX 630 to select the target address corresponding to the FTB.

Figure 6B:
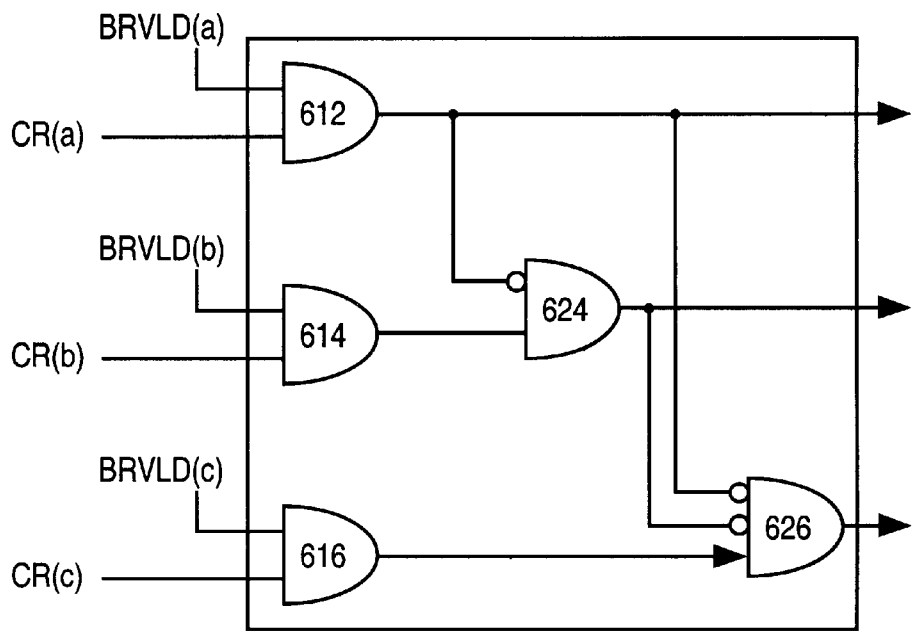

FIG. 6B illustrates one embodiment of state machine 610 for the case in which only pipeline 210(c) includes loop module 330, and branches are assigned to pipelines 210(a)–210(c) in execution order, beginning with pipeline 210(c) for single branch clusters, pipeline 210(b) for two branch clusters, and pipeline 210(a) for three branch clusters. In this embodiment, BrVld(a), (b), and (c) enable AND gates 612, 614, 616, respectively, when valid branch instructions are in pipelines 210(a), 210(b), and 210(c). AND gates 612, 624, and 626 generate an asserted signal on an output corresponding to the FTB.

As noted above, branch prediction module 120 generates predicted branch information at the front end of pipeline 100. This information is used to anticipate changes in the instruction flow through pipeline 100 before branch processing system 140 executes the branch instructions that actually determine changes in control flow. For one embodiment of the present invention, branch prediction module 120 identifies a predicted FTB (if any) and associated target address for a branch cluster. Instructions beginning at the predicted target address are prefetched into pipeline 100. Providing the prediction is correct, pipeline 100 processes the FTB and its target instructions without interruption, despite the change in control flow.

For one embodiment of the invention, branch validation module 230 checks the validity of branch prediction information against the branch information generated when the branch instructions are actually executed. As long as the predicted and resolved branch information matches, branch validation module 230 does not interfere with pipeline 100. If a mismatch is detected, branch validation module 230 triggers a pipeline flush and a resteer to instructions on the correct execution path.

Figure 7:
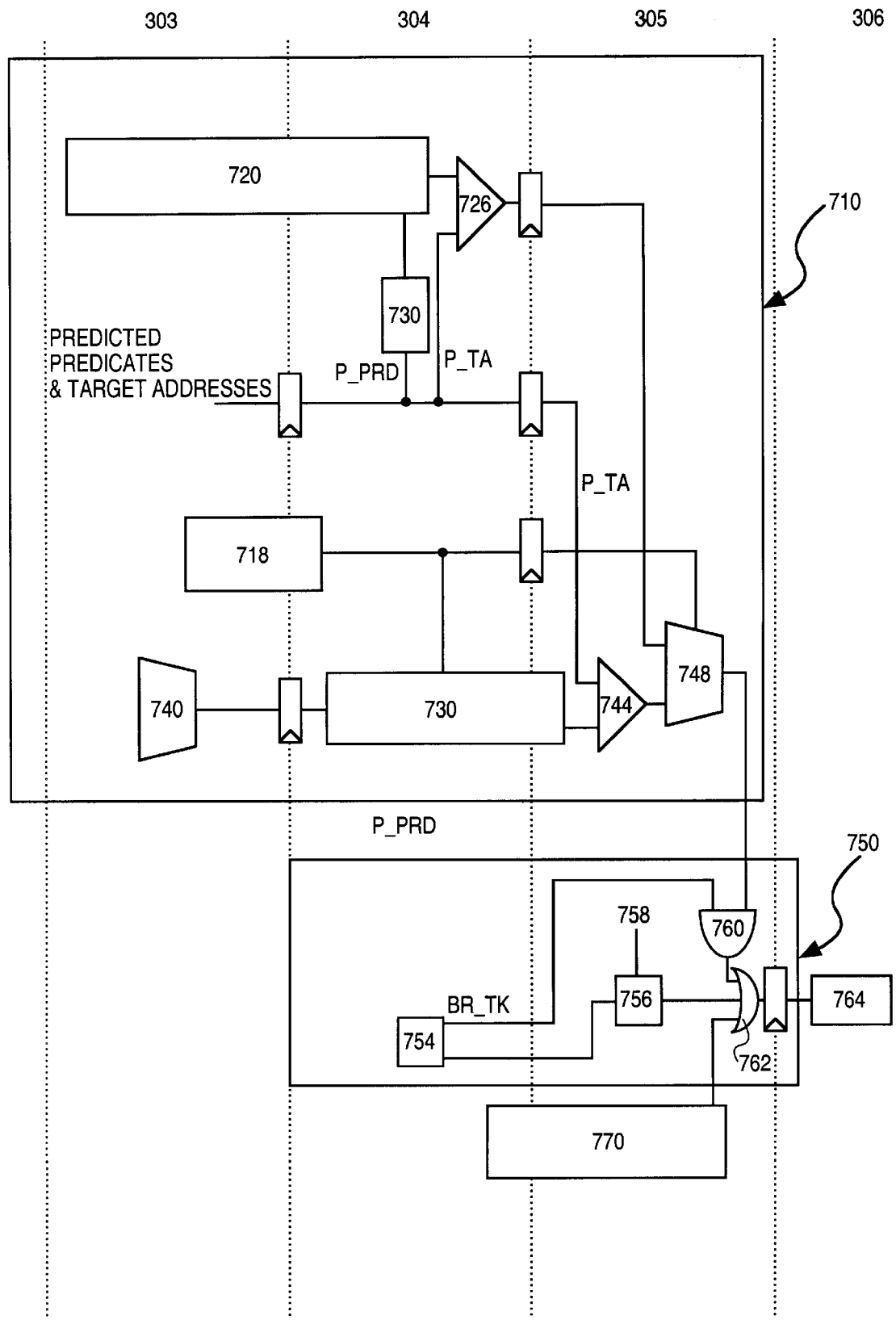
FIG. 7 is a block diagram of one embodiment of the validation module of FIG. 2.

FIG. 7 illustrates one embodiment of branch validation module 230 suitable for use with the present invention. The disclosed embodiment of branch validation module 230 includes a target check module 710, a predicate check module 750, and a loop check module 770 to check predicted target addresses, non-loop branch directions, and loop branch directions, respectively, against values determined by executing the corresponding branch instructions.

One embodiment of branch validation module 230 validates the predicted branch information by the end of stage 305, when actual results are available from pipelines 210. To accomplish this, target check module 710 uses predicted predicate values to calculate an "actual" target address, i.e. the target address of the FTB, and predicate check module 750 independently checks the predicted predicate values. An error in the actual target address attributable to an incorrectly predicted predicate is identified by predicate check module 750.

For the disclosed embodiment, target check module 710 includes first and second address generators 720 and 730, respectively, to calculate the "actual" addresses of branch instructions in the pipeline. First generator 720 determines target addresses for IP relative and indirect branches for which data is available, including those in which the target address is by-passed from stages 305 and 306. Second generator 730 determines target addresses for more tightly constrained bypasses. These includes target addresses that are provided in the same cycle as the dependent branch instruction or one cycle before the dependent branch instruction.

In the exemplary embodiment in which up to three branch instructions are processed concurrently, target generator 720 may determine up to three target addresses in stage 303. At stage 304, a state machine 730 receives predicted predicate information (P_PRD) from branch prediction module 120 and predicts an FTB. First generator 720 uses the predicted FTB to select an "actual" target address. Comparator 726 compares the selected target address against a predicted target address (P_TA) and provides the result to an input of MUX 748 in stage 305.

Second generator 730 generates a target address from highly time constrained by-pass data provided in stages 303 or 304. Comparator 744 compares the generated target address with the predicted target address, and provides the result to another input of MUX 748. A control block 718 determines when time critical bypass data is being provided and selects the appropriate target address comparison result via MUX 748. The output of MUX 748 indicates whether the "actual" address (based on predicated predicate values) and the predicted target address match.

The disclosed embodiment of predicate validation module 750 includes a validation control block 754, a predicate validation block 756 having an input 758 for receiving by-passed predicate values, an AND gate 760, and an OR gate 762. Validation control block 754 receives predicted predicates for the branch instruction(s) being processed, determines whether a branch instruction is predicted taken and if so, which branch execution pipeline 210 has the predicted FTB. A BR_TK signal line coupled to an input of AND gate 760 is asserted when the current cluster includes an FTB. In this embodiment, AND gate 760 asserts its output when an FTB is present and the "actual" and predicted target addresses do not match.

Validation control block 754 also provides a predicted predicate for the predicted FTB to predicate validation block 756, where it is compared with the actual predicate provided through bypass input 758. Predicate validation block 756 asserts an input to OR gate 762 if the predicted and actual predicates for the FTB do not match. OR gate 762 is coupled to an exception/commit module 764 in stage 306, which generates a flush signal when OR gate 762 asserts its output.

Loop validation module 770 includes logic for determining the branch direction for loop branches using speculative EC and LC values and predicted predicate values. For one embodiment of loop validation module 770, relevant EC and LC values are determined from a previous cycle to limit timing constraints. Predicate values extracted from speculative EC and LC values are compared against actual values provided through bypass 768.

Validation modules 230 provides a final check on predicted versus actual results by stage 305. Even when the predicted results are validated, however, faults may prevent the results from being committed to the architectural state. Validated results from branch processing system 140 are only committed when no faults are generated by the first taken branch instructions or the instructions that precede it in the cluster. For the disclosed embodiment of execution pipelines 210, a fault may be generated when a loop instruction is scheduled into execution pipeline 210(a) or 210(b), since neither includes loop module 330. When this or any other fault is generated, control is passed to exception/commit module 160, independent of the resolution of the branch instructions in the cluster and side effects of the FRB are not committed.

Figure 8:
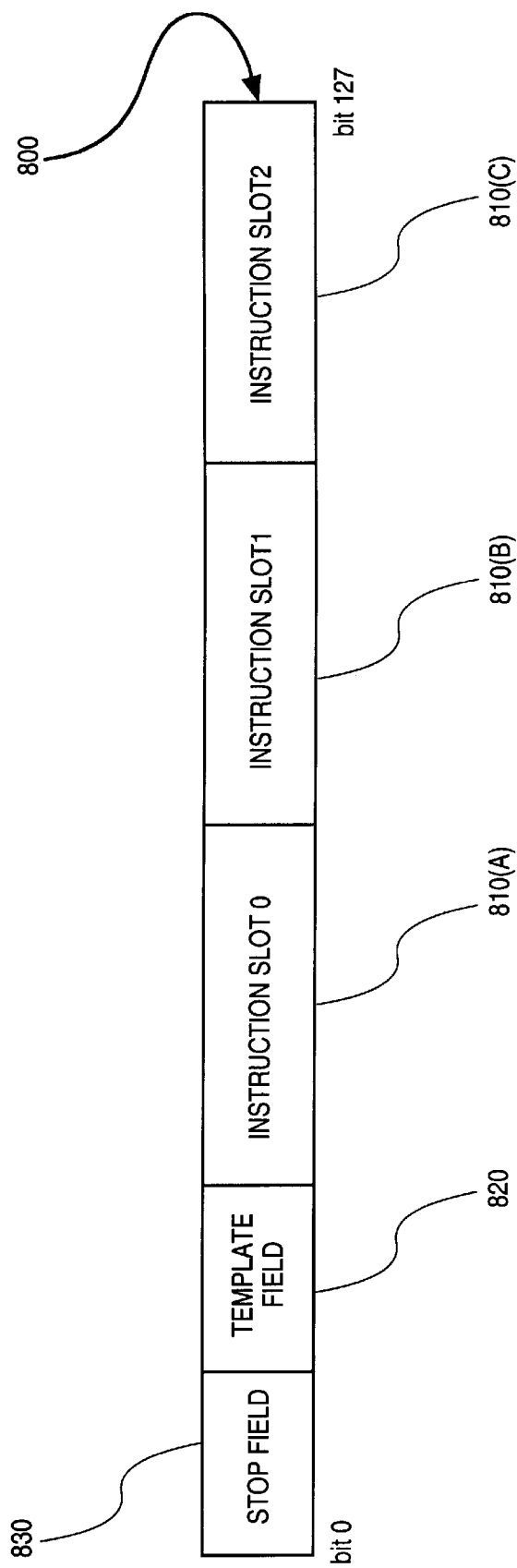
FIG. 8 is a representation of an instruction bundle suitable for delivering clustered branch instructions to the processor pipeline of FIG. 1.

Turning now to the front end of pipeline 100, FIG. 8, illustrates an embodiment of an instruction bundle 800 that is suitable for conveying clustered branch instructions to processor pipeline 100. In particular, instruction bundle 800 preserves information on the execution order of component instructions while facilitating their concurrent execution.

The disclosed embodiment includes three instruction slots 810(a)–210(c) (collectively, instruction slots 810), a template field 820, and a stop field 830. Each instruction slot 810 includes an opcode field for indicating the instruction type, as well as operand fields for specifying information necessary to implement the instruction. Template field 820 indicates how instruction slots 810 are mapped to execution units in the processor pipeline. Template and stop fields 820, 830 may also provide dependency information for the instructions in cluster 800.

To facilitate assignment of branch instructions to pipelines 210, clustered branch instruction(s) may be assigned to slots 810(c), 810(b), 810(a) beginning with the last branch in execution order in the rightmost slot (810(c)). Table 2 illustrates examples of different branch instruction configurations for instruction bundle 800.

TABLE 2

| TEMPLATE | SLOT 0 | SLOT 1 | SLOT 2 |
|---|---|---|---|
| 1 | M-Unit | I-Unit | B-Unit |
| 2 | M-Unit | B-Unit | B-Unit |
| 3 | B-Unit | B-Unit | B-Unit |
| 4 | M-Unit | M-Unit | B-Unit |
| 5 | M-Unit | F-Unit | B-Unit |

Here, M, I, and B represent instructions destined for memory, integer, and branch instruction execution units, respectively.

Figure 9:
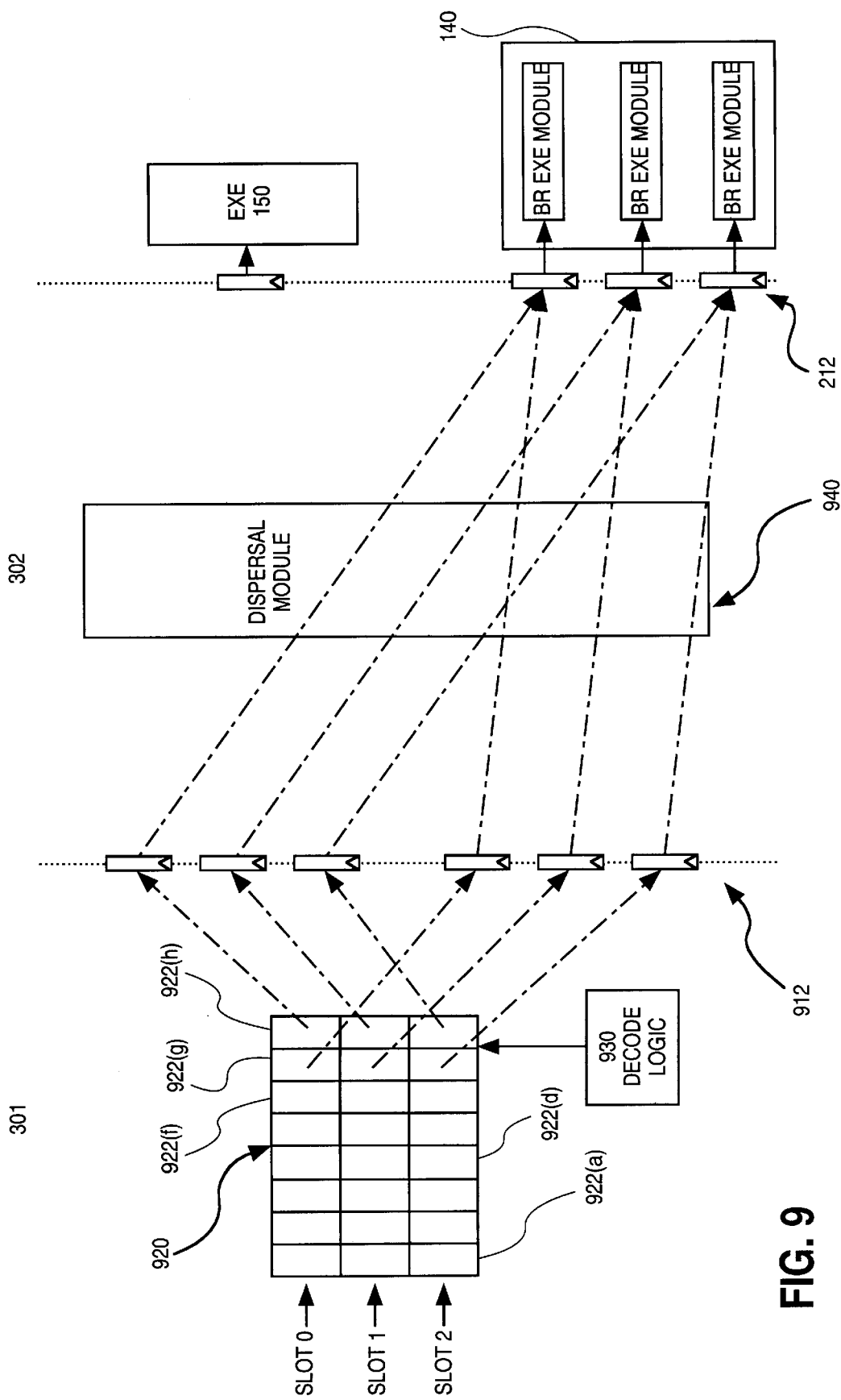
FIG. 9 is a block diagram illustrating one embodiment of the decode module of FIG. 1.

FIG. 9 is a block diagram of one embodiment of decode module 130 of processor pipeline 100 suitable for processing clustered branch instructions in the above format. The disclosed embodiment of decode module 130 includes an instruction buffer 920 and a dispersal module 940. Instruction buffer 920 receives clustered branches, e.g. in the form of bundles 800, and dispersal module 940 routes instructions from instruction buffer 920 to execution units according to template 820. Latches 912 couple instruction information between instruction buffer 910 and dispersal module 940, and issue ports 212 couple instructions from dispersal module 940 to branch processing module 140 and other execution modules 150.

For the disclosed embodiment of pipeline 900, instruction buffer 920 comprises, e.g., eight entries 922(a)–922(h) (collectively, entries 922), each having three slots designated 0 to 2 in execution order. Instructions from selected entries 922 are provided to dispersal module 940 under control of decode logic 930. Decode logic 930 reads template field 820, and provides appropriate routing information to dispersal module 940. Dispersal module 940 thus maps instructions in bundle entry 922 to issue ports 212 for different execution units, according to data provided in template field 820.

For the disclosed embodiment, instructions from entries 922(h) and 922(g), may be processed concurrently, so that up to 6 instructions can be issued per clock cycle, depending on the availability of resources. The number of branch instructions that can be handled concurrently is limited only by the branch execution resources provided. In pipeline 100, up to three branch instructions from two bundles can be executed concurrently using execution pipelines 210(a), 210(b), 210(c). If an additional three branch execution units are provided, up to six branch instructions could be processed concurrently. Similar expansions are possible for each of the different types of execution units.

Bundling branch instructions in later executed slots of buffer entries 922 provides a number of benefits for branch processing. For example, because taken branches resteer instruction fetch to a new address, they terminate groups of independent instructions. Any instruction in the instruction group that followed the taken branch in execution order would have to be suppressed. Suppressing non-branch instructions following a taken branch would impose significant timing pressures on pipeline 100. For example, if memory or integer instructions followed a branch instruction in execution order in an entry 922, signal transmission from branch processing module 140 to the memory or integer unit 150 may entail significant time delays relative to the clock cycle time of the pipeline stages. Where the taken branch instruction is followed in execution order by other branch instructions in the bundle, the following branch instructions can be suppressed efficiently by the branch logic, since branch execution pipelines 210 are adjacent.

As noted above, loop branch instructions are preferably scheduled into a single execution pipeline 210(c) to reduce the amount of loop logic. Because loop instructions require more time and resources to resolve, there is less time to suppress retirement of any (branch) instructions that follow them in an instruction bundle. Scheduling loop branches in pipeline 210(c), which receives the last instruction in execution order, eliminates this problem.

Figure 10:
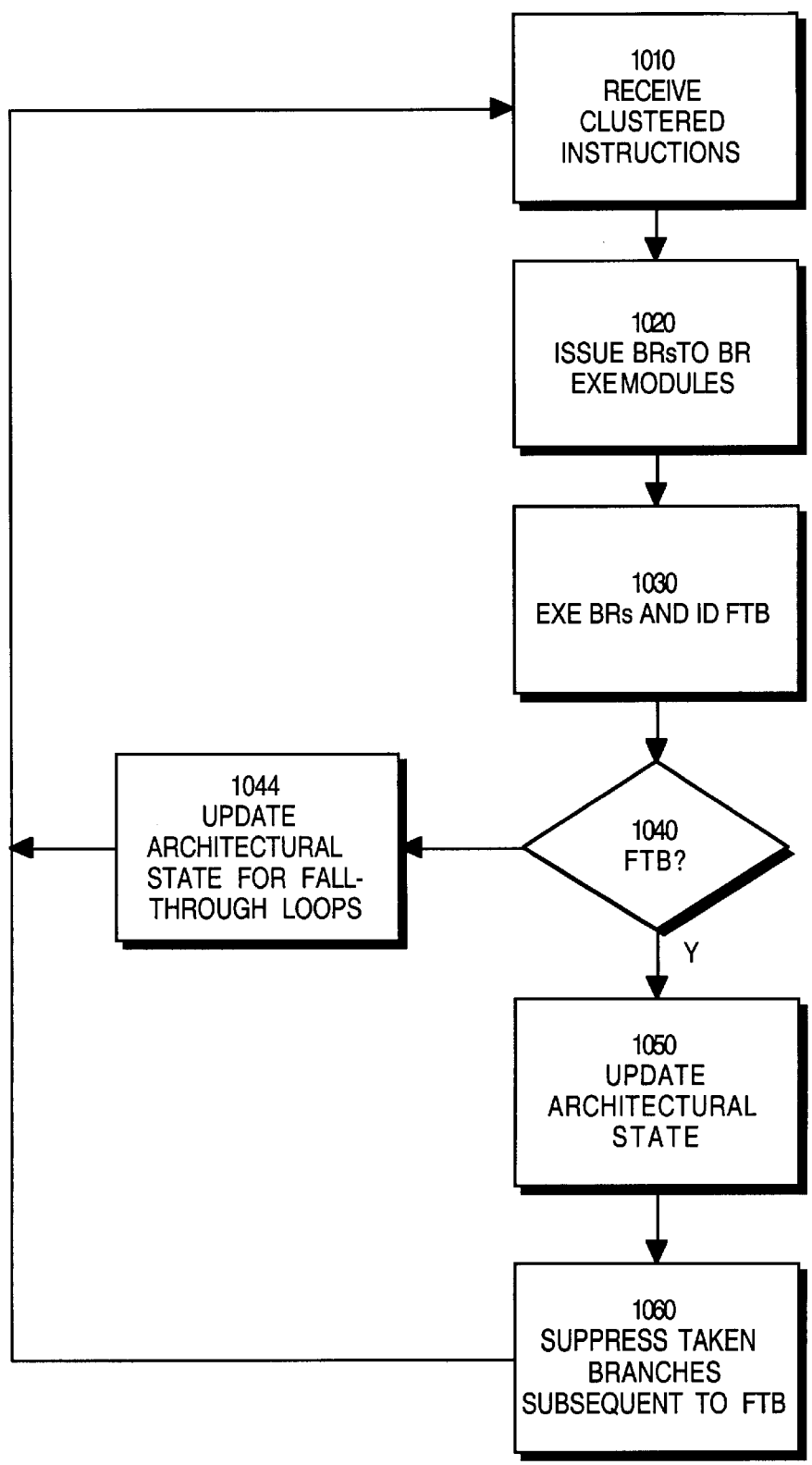
FIG. 10 is a flow chart illustrating a method in accordance with the present invention for processing clustered branch instructions concurrently.

FIG. 10 is a flowchart representing a method 1000 in accordance with the present invention for processing clustered branch instructions. According to method 1000, a cluster of branch instructions is received 1010 and the branch instructions are issued 1020 to branch execution pipelines 210 according to their execution order (EO). The instructions are executed 1030 and their directions are determined to identify an FTB. If no FTB is identified 1040 e.g. none of the branch directions are resolved taken, the next branch cluster is received 1010 for processing. If an FTB is identified 1040, the architectural state is updated 1050 to reflect the FTB. For one embodiment of method 1000, any taken branch in the cluster following the FTB is suppressed 1060. In addition, if an FTB is not identified 1040, the architectural state is updated 1044 to reflect any fall through loop branches.

There has thus been provided a system for processing clustered branch instructions concurrently. The clustered branch instructions are each assigned to a branch execution pipeline and processed to determine their directions and target addresses (if resolved taken). Linking logic identifies a first taken branch from the cluster and updates the architectural state to reflect the taken branch. Resolution and target information from instructions that are later in execution order are suppressed. For one embodiment of the invention, predicted branch information is validated against resolved branch information for the first taken branch, and the pipeline is resteered if a misprediction is detected.

What is claimed is:

1. A method for processing a cluster of branch instructions comprising:
   reading a template associated with the cluster of branch instructions;
   issuing each branch instruction to a branch execution module, each branch execution module having an execution priority;
   executing the issued branch instructions concurrently to determine a target address and direction for each branch instruction;
   identifying a first taken branch, in execution order, according to the determined direction for each branch instruction and the execution priority of the branch execution module that determined it; and
   suppressing any branch instructions in the cluster that follows the identified first taken branch instruction in execution order.

2. The method of claim 1, wherein identifying a first taken branch comprises identifying a highest execution priority branch execution module for which the direction of the issued branch instruction is taken.

3. The method of claim 2, wherein only the branch execution module having a lowest priority includes a loop branch execution unit.

4. The method of claim 1, further comprising:
   receiving branch prediction information for the cluster; and
   comparing the identified first taken branch with a predicted first taken branch.

5. The method of claim 4, wherein comparing comprises:
   comparing the predicted and identified first taken branches; and
   comparing a target address associated with the identified first taken branch with a predicted target address.

6. The method of claim 5, further comprising:
   updating an architectural state when the predicted and identified results agree; and
   resteering processing to the associated target address when the results disagree.

7. The method of claim 1, wherein executing the branch instructions further comprises speculatively saving any side effects associated with executing the branch instructions.

8. A system for processing one or more branch instructions concurrently, the system comprising:
   a plurality of branch execution units, each having a priority and each being capable of executing a branch instruction to determine branch resolution information;
   a dispersal module to assign branch instructions from an instruction bundle to the branch execution units according to a template associated with the instruction bundle; and
   linking logic to determine a first taken branch from branch resolution information for each of the branch instructions and the priority of its assigned branch execution unit.

9. The system of claim 8, further comprising a branch validation module to compare branch resolution information for the first taken branch with predicted branch resolution information and to generate an exception and update predicted branch information when the comparison indicates no match.

10. The system of claim 9, further comprising exception/commit logic to modify architectural state data according to the first taken branch instruction when no exception is indicated.

11. The system of claim 10, wherein the branch resolution information includes target address and condition information.

12. The system of claim 11, wherein the branch validation unit compares predicted and actual condition resolutions in a first stage and predicted and target resolutions in a second stage.

13. The system of claim 12, wherein the second stage is bypassed if the predicted condition resolution is "not taken".

14. The system of claim 8, wherein the branch execution unit having a lowest priority includes logic for processing complex branch instructions and all complex branch instructions are scheduled to the lowest priority branch execution unit.

15. The system of claim 14, wherein the complex branch execution logic includes logic for executing loop branch instructions ad return from interrupt instructions.

16. The system of claim 9, wherein the validation and execution modules operate in parallel.

17. A processor comprising:
   a decode module to issue branch instructions to a plurality of prioritized branch execution pipelines according to a template field associated with the branch instructions;
   the plurality of prioritized branch execution pipelines to execute the issued branch instructions concurrently to generate prioritized branch information for the branch instructions; and
   linking logic to identify a first taken branch from the prioritized branch information.

18. The processor of claim 17, further comprising;
   a branch prediction module to provide predicted branch information; and
   a validation module to compare the predicted branch information with branch information for the first taken branch and generate a resteer signal when the predicted branch information does not agree with the first taken branch information.

19. The processor of claim 18, wherein a prioritized branch execution pipeline having a lowest priority includes a loop module to process loop branch instructions and the decode module issues loop branch instructions to the lowest priority branch execution pipeline.

20. A system for processing of one or more branch instructions concurrently, the system comprising:
   means for executing a plurality of branch instructions concurrently to provide resolved branch information, the executing means having an associated execution order;
   means for issuing a plurality of branch instructions to the executing means according to a template associated with the branch instructions; and
   means for processing resolved branch information, the processing means to determine a first taken branch instruction from the resolved branch information and the associated execution order of the executing means.

21. The system of claim 20, wherein the executing means includes a plurality of branch execution pipelines, each designated to receive a branch instruction having a specified execution order.

22. The system of claim 21, wherein the issuing means uses the template to route the associated branch instructions to an appropriately designated branch execution pipeline.

23. The system of claim 20, further comprising means for validating the first executed taken branch by comparing resolved branch information for the first taken branch with predicted branch information.

24. The system of claim 23, wherein the validating means includes target address validation means and condition validation means that operate in parallel with the branch execution means.

25. The method of claim 7, further comprising updating an architectural state with a speculatively saved side effect of the first taken branch.

26. The method of claim 25, further comprising updating the architectural state with a speculatively saved side effect of a loop branch that precedes the first taken branch in execution order.

27. The system of claim 8, wherein the template indicates a number of branch instructions in the instruction bundle and each branch execution unit has a prescribed priority for a given number of branch instructions.

28. The system of claim 8 wherein the template specifies one or more valid branch signals and the linking logic identifies the first taken branch according to the received branch resolution information and valid branch signals.

29. A processor comprising:

first through $N^{th}$ branch execution units to execute up to N branch instructions concurrently, each of the N branch execution units having an execution order determined by a number of branch instructions to be executed concurrently;

a decode module to route up to N branch instructions of an instruction bundle to selected ones of the first through $4^{th}$ branch execution units according to a template associated with the instruction bundle; and linking logic to determine a first taken branch for the instruction bundle responsive to branch condition signals indicated by the N branch execution units and branch valid signals indicated by the template.

30. The processor of claim 29, wherein the $(N-P)^{th}$ through $N^{th}$ branch execution units have execution orders 1 through P, respectively, for an instruction bundle that contains P branch instructions.

31. The processor of claim 30, wherein the decode module triggers branch valid signals for the $(N-P)^{th}$ through $N^{th}$ branch execution units, responsive to the template of the instruction bundle.

32. The processor of claim 30, wherein the linking logic determines the first taken branch from a first of the P branch valid signals for which an associated branch execution unit indicates a taken branch condition.

* * * * *